M. ROPE.
DETACHABLE RETAINER FOR MATCHES.
APPLICATION FILED JAN. 22, 1917.
1,385,474.
Patented July 26, 1921.
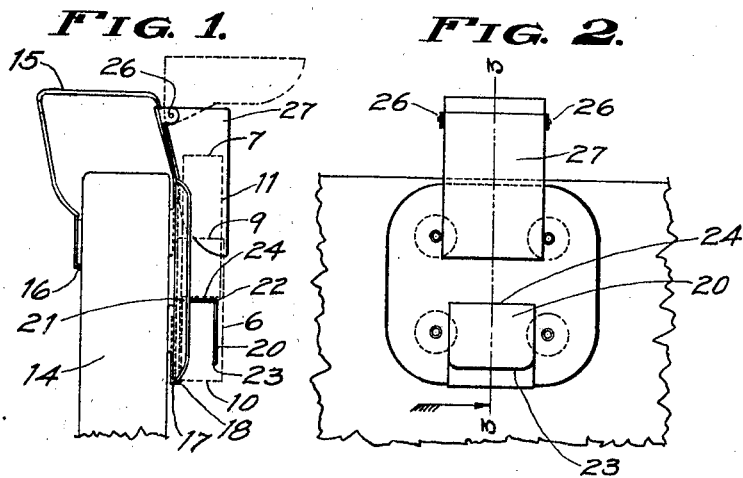
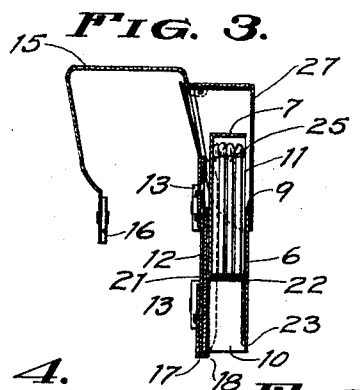
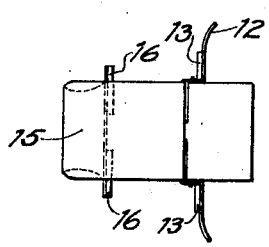
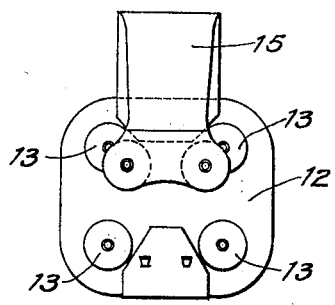
INVENTOR
Max Rope
BY
W. F. Davis & Son.
ATTORNEY

UNITED STATES PATENT OFFICE.

MAX ROPE, OF KANSAS CITY, MISSOURI.

DETACHABLE RETAINER FOR MATCHES.

1,385,474. Specification of Letters Patent. Patented July 26, 1921.

Application filed January 22, 1917. Serial No. 143,673.

*To all whom it may concern:*

Be it known that I, MAX ROPE, a citizen of the United States, residing at Kansas City, in the county of Jackson and State of Missouri, have invented certain new and useful Improvements in Detachable Retainers for Matches, of which the following is a full, clear, and exact description, such as will enable others skilled in the art to which it appertains to make and use the same.

The invention relates to a retainer for containing matches and seeks to provide a simple and efficient form of retainer which can be instantly attached to and detached from the door of an automobile and the like for storing matches conveniently for the occupants of the automobile.

Matches are frequently required for various purposes when traveling in the automobile and it is essential that some means be provided whereby they can be stored so that the occupants of the automobile can be supplied at all times.

The present invention seeks to provide an improved form of retainer for matches that can be instantly attached to the automobile so that the matches will be obtainable by the occupants of the automobile at all times.

With these and other objects in view, the invention consists in the features of construction, combinations and arrangements of parts hereinafter set forth and more particularly pointed out in the appended claim, the accompanying drawings illustrating an application of the invention.

In the drawings:—

Figure 1 is a view in elevation of the improved retainer and a fragmentary view of an automobile door with an ordinary match box shown in dotted lines within the retainer.

Fig. 2 is a view in elevation of the retainer and a fragmentary view of the automobile door to which the retainer is attached.

Fig. 3 is a sectional view of the retainer taken on line 3—3 of Fig. 2, and a match box containing matches shown within the retainer.

Fig. 4 is a plan view of the retainer.

Fig. 5 is a view in elevation of the retainer illustrating the reverse side from that shown in Fig. 2.

The telescopic cover 6 and the match box 7 are of common and well known construction, the cover 6 being open at the ends 9 and 10 so that the box 7 will slide therethrough, while the box 7 is open at the side 11 so that when it is partly withdrawn from the telescopic cover 6 as shown in Fig. 3, the matches can be removed from the match box 7 as desired.

The plate 12 is of thin sheet metal and provided with the resilient bearing seats 13 preferably of rubber to form a bearing against the door 14 and prevent scratching of the paint thereon, the door being of common and well known construction.

The spring 15 projects upward from the plate 12 to some distance above the door 14 and then across the top thereof and downwardly on the opposite side of the door, and is provided with the rubber seats 16 which bear against the door on the opposite side from the plate 12 and the seats 13, the tension of the spring gripping the seats 13 and 16 against the door with sufficient pressure to support and hold the retainer in position, although the latter may be removed and again replaced at will, the spring and rubber seats forming an easily attachable and detachable means of mounting the retainer on the door 14 and like suitable locations.

Projecting upward from the bottom 17 of the plate 12 and on the side 18 thereof and spaced slightly therefrom, is the base 20 paralleling the plate 12 to the right angled bend 21, then projecting directly from the plate 12 to the right angled bend 22, from which the base is disposed downwardly to the end thereof 23.

The base 20 forms a flat seat 24 between the right angled bends 21 and 22 and fits within the telescopic cover 6 and supports the match box 7 and the matches 25 as shown in Fig. 3.

Hinged at 26 is the cover 27 which covers the matches 25 and protects them from the weather and adds to the appearance of the retainer, the lid being shown in closed position in Figs. 2 and 3, and full lines of Fig. 1 also in open position in dotted lines of the latter figure.

The retainer can be attached to the door of the usual automobile, and like places, by simply spreading the seats 16 away from the seats 13 by the resiliency of the spring 15 and placing the retainer as shown, the spring in this position firmly gripping the seats against the door and holding the retainer in position without moving or scratching the paint of the door or other object to which the retainer is attached.

The retainer is easily removed by separating the seats 16 from the seats 13 by the resilience of the spring 15, and when detached is easily carried in a small place, as in the pocket of a person's clothing.

What I claim as new, and desire to secure by Letters Patent, is:—

In a detachable retainer for ordinary match boxes, a bearing plate adapted to engage an automobile door, a sheet metal plate attached to the lower edge of said bearing plate and extending upwardly near said bearing plate but separated therefrom and forming a rectangular flat base to receive and retain a match box allowing the match box cover to slide down over the base to near the bottom of said bearing plate, a spring projecting upwardly from said bearing plate and then outwardly from said bearing plate and then downwardly along side of said bearing plate, the outwardly and downwardly projecting end of said spring separated from said bearing plate to span and grip an automobile door and bind said bearing plate thereto, a lid hingedly connected to said spring and provided with closed sides so that when said lid is closed over a match box it will protect the match box and any matches therein from the weather.

MAX ROPE